(12) United States Patent
Zhang et al.

(10) Patent No.: US 7,255,490 B2
(45) Date of Patent: Aug. 14, 2007

(54) SMALL FORM FACTOR PLUGGABLE OPTICAL TRANSCEIVER HAVING AUTOMATIC-RESTORING UNLOCKING MECHANISM AND MECHANISM FOR LOCATING OPTICAL TRANSCEIVER COMPONENTS

(75) Inventors: Chao Zhang, Chengdu (CN); Zhong Yang, Chengdu (CN); Xiaobo Tang, Chengdu (CN); Linhua Zhang, Chengdu (CN); Hongbin Wang, Chengdu (CN)

(73) Assignee: Fiberxon, Inc., Santa Clara, CA (US)

( * ) Notice: Subject to any disclaimer, the term of this patent is extended or adjusted under 35 U.S.C. 154(b) by 678 days.

(21) Appl. No.: 10/815,326

(22) Filed: Apr. 1, 2004

(65) Prior Publication Data

US 2005/0226626 A1    Oct. 13, 2005

(51) Int. Cl.
*G02B 6/36* (2006.01)
*G02B 6/00* (2006.01)

(52) U.S. Cl. .................... 385/88; 385/53; 385/92; 385/139; 398/135; 398/138; 398/139

(58) Field of Classification Search ............ 385/88
See application file for complete search history.

(56) References Cited

U.S. PATENT DOCUMENTS

| | | | |
|---|---|---|---|
| 5,588,080 A | 12/1996 | Kawamura | |
| 6,335,869 B1 | 1/2002 | Branch | |
| 6,371,663 B1 | 4/2002 | Kneier | |
| 6,430,053 B1 * | 8/2002 | Peterson et al. | 361/728 |
| 6,609,838 B1 | 8/2003 | Branch | |
| 6,819,568 B2 * | 11/2004 | Cao | 361/728 |
| 7,004,647 B2 * | 2/2006 | Malagrino et al. | 385/92 |
| 7,040,911 B1 * | 5/2006 | Ho et al. | 439/352 |
| 7,066,746 B1 * | 6/2006 | Togami et al. | 439/157 |
| 7,083,336 B2 * | 8/2006 | Kim et al. | 385/92 |
| 2002/0093796 A1 | 7/2002 | Medina | |
| 2003/0027440 A1 | 2/2003 | Birch | |
| 2003/0044121 A1 | 3/2003 | Shang | |
| 2003/0049000 A1 | 3/2003 | Wu | |
| 2003/0072137 A1 | 4/2003 | Yen | |
| 2003/0072540 A1 | 4/2003 | Huang | |
| 2003/0156801 A1 | 8/2003 | Hwang | |
| 2003/0194190 A1 | 10/2003 | Huang | |
| 2003/0206403 A1 | 11/2003 | Zaremba | |
| 2003/0214789 A1 | 11/2003 | Medina | |
| 2004/0008954 A1 | 1/2004 | Shaw | |
| 2004/0029417 A1 | 2/2004 | Engel | |

\* cited by examiner

*Primary Examiner*—Frank G. Font
*Assistant Examiner*—Mary El-Shammaa
(74) *Attorney, Agent, or Firm*—Fish & Richardson P.C.

(57) ABSTRACT

An optical transceiver module includes a housing comprising a first end and a second end, an electrical interface associated with the first end and an optical interface associated with the second end. The electrical interface is adapted to be locked into a receiving cage. The optical interface is adapted to be connected with one or more optical transceiver components. The optical transceiver module includes a locating mechanism that restrains the one or more optical transceiver components. The optical transceiver module also includes a locking mechanism that can lock the optical transceiver module to a receiving cage. The optical transceiver module further includes an automatic-restoring unlocking mechanism comprising a sliding plate, an unlocking lever, and a restoration spring, wherein the automatic restoring unlocking mechanism automatically restores the sliding plate to the normal position after the optical transceiver module is unlocked from the receiving cage.

20 Claims, 15 Drawing Sheets

SMALL FORM FACTOR PLUGGABLE OPTICAL TRANSCEIVER HAVING AUTOMATIC-RESTORING UNLOCKING MECHANISM AND MECHANISM FOR LOCATING OPTICAL TRANSCEIVER COMPONENTS

CROSS-REFERENCES TO RELATED INVENTIONS

The present invention is related to commonly assigned U.S. patent application Ser. No. 10/741,805, filed on Dec. 19, 2003, titled "Bi-directional optical transceiver having automatic-restoring unlocking mechanism", Chinese Patent Application 200420032601.2, filed on Jan. 17, 2004, titled "Small Form Factor Pluggable Optical Transceiver". The disclosures of these related applications are incorporated herein by reference.

TECHNICAL FIELD

This disclosure relates to electro-optical devices, specifically, a small form factor pluggable (SFP) optical transceiver module for point-to-point applications.

BACKGROUND

Optical transceivers are widely used in both data communication and telecommunication fields. Computers are increasingly being connected with communication lines and other devices or networks with the computers performing as servers to the peripherally connected computers or devices. The volume of data sent and received by the computer serving as a server of a network is such that the networks are advantageously constructed using optical fiber lines in order to increase the throughput of data.

Optical fiber lines and the associated optical signals require transceivers to convert the optical light pulse signals to electronic signals, which are usable by the telecommunication systems and computer systems. Such a transceiver includes a transmitting optical component and a receiving optical component to send and receive the optical signals.

Industry standards and agreements have been established to define the physical parameters of the transceiver devices and, particularly, the overall interface. This permits the interconnection of different devices manufactured by different manufacturers without the use of physical adapters.

One of such industry agreements is the Small Form-factor Pluggable (SFP) Transceiver MultiSource Agreement (SFP MSA or SFP agreement). The SFP agreement establishes a module enclosure. The module may be connected to a module interface on the main circuit board. An optical transceiver module is a telecommunication device that can receive optical signals, convert the received optical signals into electrical signals, and output the electrical signals. Simultaneously, the optical transceiver module can also receive electrical signals, convert the received electrical signals into optical signals, and output the optical signals and carry on the transmission. A common optical transceiver module can have different kinds of housings to abide by some agreements or standards. For example, an SFF (small form-factor) agreement housing includes an electrical interface, and an optical interface. An SFP (Small Form-factor Pluggable) compatible housing includes an electrical interface, and an optical interface. A 1×9 transceiver (a module structure by Lucent) housing includes an electrical interface and an optical interface for receiving or transmitting electrical and optical signals.

When an SFP module is used in applications, it is plugged into a receiving cage and is locked inside the receiving cage with a lock mechanism. In most prior art, an SFP optical transceiver module needs to be pulled out of the cage with two fingers. The two fingers require a finger size space between two neighboring optical transceiver modules, thus setting an upper limit to the density of the optical transceiver module matrix in application. In ordering to eliminate the requirement of pulling off an optical transceiver module by two fingers, an unlocking mechanism is needed. Some prior art optical transceiver modules have unlocking mechanisms allowing an optical transceiver module to be unlocked from its receiving cage by pushing a sliding plate into the receiving cage. There is still a need for a finger space for holding the module so it can be held and pulled out. The sliding plate of the locking mechanism has to be manually restored to its original position after the optical transceiver module is unlocked. If the manual step is skipped, the optical transceiver module may still remain in the unlocked condition, making the optical transceiver module unsafe and unreliable for operation. Some other prior art systems have made attempts to eliminate this manual restoration step. But the prior art systems remain to be complex, expensive to manufacture, and not easy to use.

Optical transceiver components fabricated by many manufacturers have different designs and physical dimensions. In most prior art systems, the housing case bodies of the optical transceiver modules need to be redesigned to fit the optical transceiver components from different manufacturers. The design and manufacturing tailored to each manufacturer is costly and time consuming.

SUMMARY

In one aspect, the present application discloses an optical transceiver module, comprising
  a) a housing comprising a first end and a second end;
  b) an electrical interface associated with the first end, said electrical interface being adapted to be locked into a receiving cage;
  c) an optical interface associated with the second end, said optical interface adapted to be connected with one or more optical transceiver components;
  d) a locating mechanism that restrains the one or more optical transceiver components;
  e) a locking mechanism that can lock the optical transceiver module to a receiving cage; and
  f) an automatic-restoring unlocking mechanism comprising a sliding plate, an unlocking lever, and a restoration spring, wherein the automatic restoring unlocking mechanism automatically restores the sliding plate to the normal position after the optical transceiver module is unlocked from the receiving cage.

In another aspect, the present application discloses a modular optical transceiver module, comprising
  a) a housing comprising a first end and a second end;
  b) an electrical interface associated with the first end, said electrical interface being adapted to be locked into a receiving cage;
  c) an optical interface associated with the second end, said optical interface adapted to be connected with one or more optical transceiver components;
  d) an interchangeable locating mechanism that restrains the one or more optical transceiver components, wherein the interchangeable locating mechanism is specifically designed for locking the specific design of the one or more optical transceiver components;

e) a locking mechanism that can lock the optical transceiver module to a receiving cage; and f) an automatic-restoring unlocking mechanism comprising a sliding plate, an unlocking lever, and a restoration spring, wherein the automatic restoring unlocking mechanism automatically restores the sliding plate to the normal position after the optical transceiver module is unlocked from the receiving cage.

In another aspect, the present invention provides a practical optical transceiver module that abides SFP MSA, including one case body, one sheet metal cover fixed on one end of the case body, one upper case cover and one lower case cover fixed on the other end of the case body, one electrical interface and one optical interface situated at the two ends of the case body respectively and an automatic restoring unlocking mechanism located on the case cover. It can be used to unlock the optical transceiver module from its receiving cage and automatically restore the optical transceiver module to its normal position.

In yet another aspect, the present application provides an optical transceiver module that abides SFP MSA. The optical transceiver module has an unlocking mechanism that automatically restores the sliding plate back to its normal condition after the optical transceiver module is unlocked. This capability allows the optical transceiver module to be always in a locking state. Moreover, the optical transceiver module can be pulled out of the receiving cage by holding the unlocking lever. The finger space is eliminated resulting in more compact module design.

In still another aspect, the present invention provides an optical transceiver module that is compatible with SFP MSA and is capable of connecting two optical transceiver components. The optical transceiver module further includes a locating mechanism for locating the two optical transceiver components inside the optical transceiver module. This locating mechanism provides a modular design for the optical transceiver module's case body that can be shared for different types of optical transceiver components. When the physical dimensions of the optical transceiver components are changed, only the locating rack and its retainer need to be redesigned while the optical transceiver module's case body design can remain the same. The locating rack and the retainer also make increase the Electromagnetic Compatibility (EMC) of the two optical transceiver components.

In still another aspect, the invention SFP optical transceiver module is inexpensive to manufacture, of high performance-to-price ratio, high reliability, and convenient to install and maintain. It can be desirably applied to a point-to-point system.

In another aspect, the present application provides an optical transceiver module that includes an SFP agreement electrical interface, and an SFP optical interface that can be connected with 2 optical fibers having 2 LC standard connectors.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Fiber optical transceiver modules are widely used in telecommunication networks. An optical transceiver module receives optical signals, converts the received optical signals into electrical signals and transmits the electrical signals. Such an optical transceiver module also simultaneously receives electrical signals, converts the received electrical signals into optical signals and transmits the optical signals.

Figure 1:
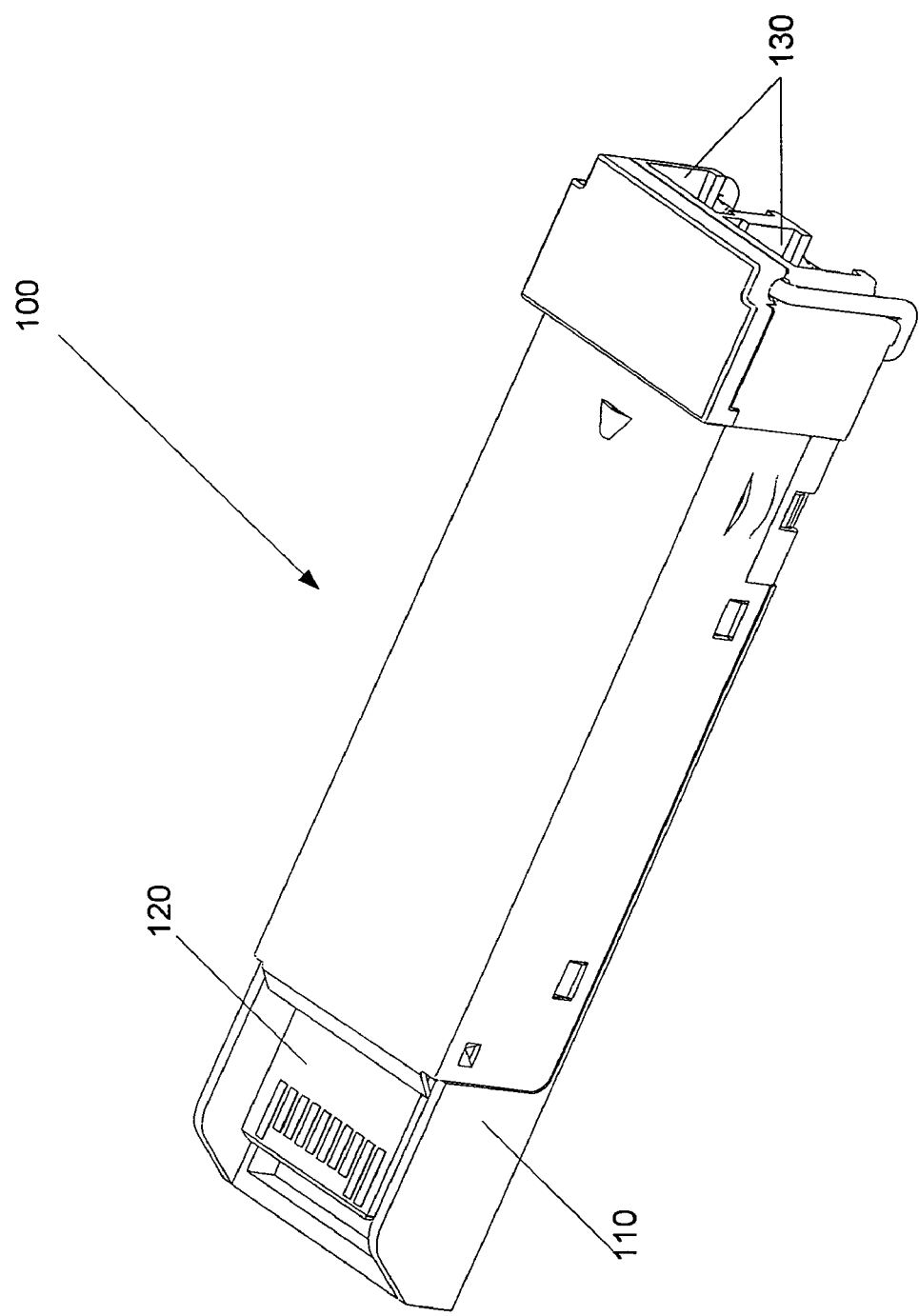
FIG. 1 is a perspective view of the SFP optical transceiver module that can simultaneously connect to two optical transceiver components in accordance with the present invention.

FIG. 1 is a perspective view of the optical transceiver module 100 in accordance with the present invention. The optical transceiver module 100 comprises a housing 110, a first end 120 associated with an electrical interface, and a second end 130 associated with an optical interface.

Figure 2:
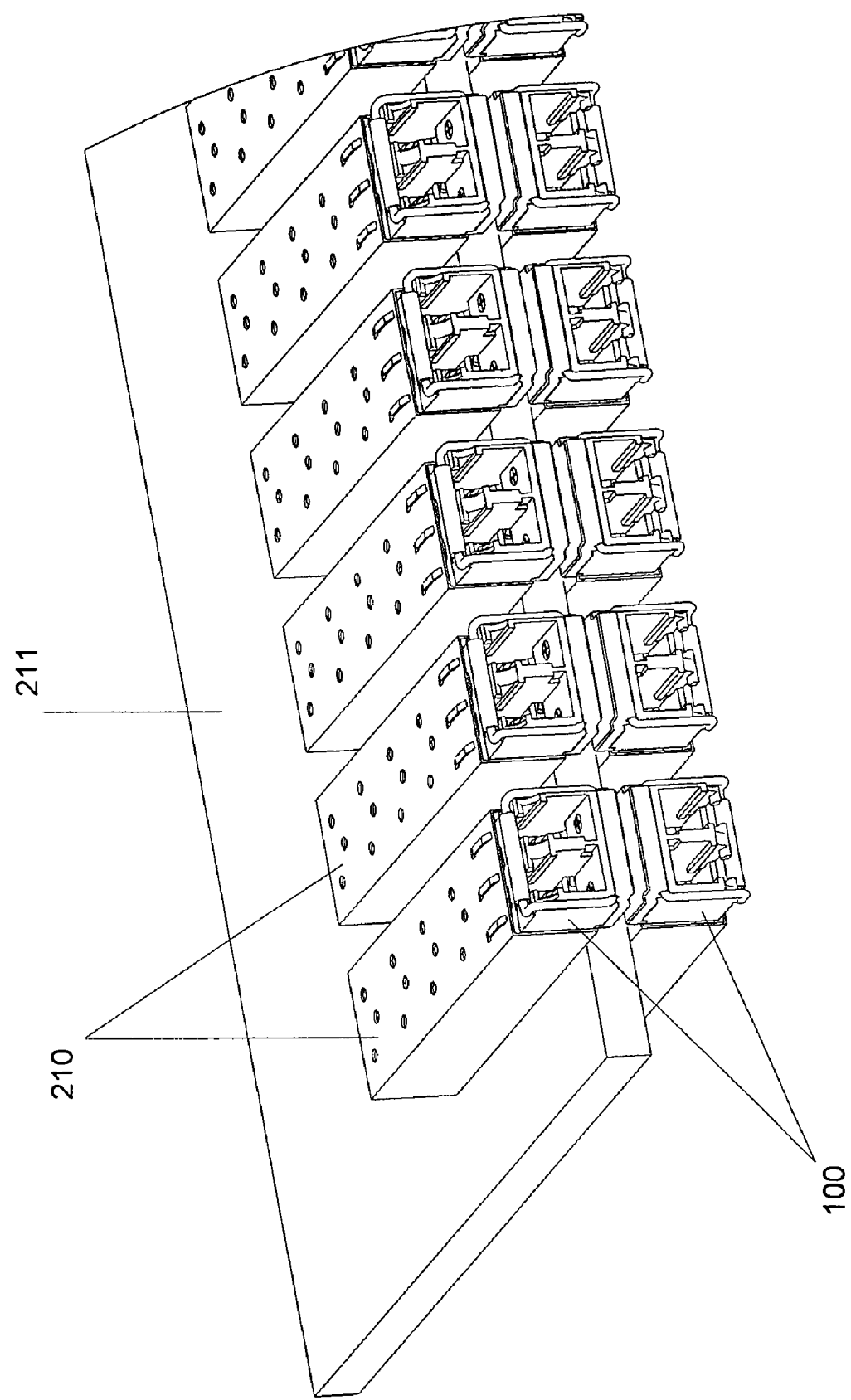
FIG. 2 is a perspective view of a matrix of high-density SFP optical transceiver modules in application.

During an application, the optical transceiver module 100 is pushed into a secured position inside a receiving cage 210 as shown in FIG. 2, where the optical transceiver module 100 is connected to a fiber optical network on its second end 130 and connected to an electrical interface of an electronic device on its first end 120. The optical transceiver module 100 is subject to various industry standards and agreements between common vendors. The electrical interface 120 of such an optical transceiver module is required to be SFP compliant. The housing 110 of the optical transceiver module 100 abides SFP agreement. The optical interface 130 is compliant with SFP agreement. When the optical transceiver module 100 needs to be unplugged from its receiving cage 210, it can be pulled out of its receiving cage with two fingers. The use of two fingers requires at least one finger space between two neighboring optical transceiver modules. Yet, in real applications, it is desirable to increase the density of optical transceiver modules as high as possible, and a finger wide space between two neighboring optical transceiver modules greatly reduces the optical transceiver module matrix density. Thus an unlocking mechanism is needed wherein it is not necessary to pull an optical transceiver module out of its receiving cage by two fingers on the two sides of the module. This present invention provides an auto restoring unlocking mechanism that unlocks an optical transceiver module from its receiving cage by rotating an unlocking lever, and holding the unlocking lever to pull out the module. The need for finger space between the two neighboring modules is eliminated, resulting in a higher packing density in the module. Furthermore, the auto restoring unlocking mechanism restores the optical transceiver module 100 back to its normal condition where it is ready to be plugged into a cage again.

Figure 3:
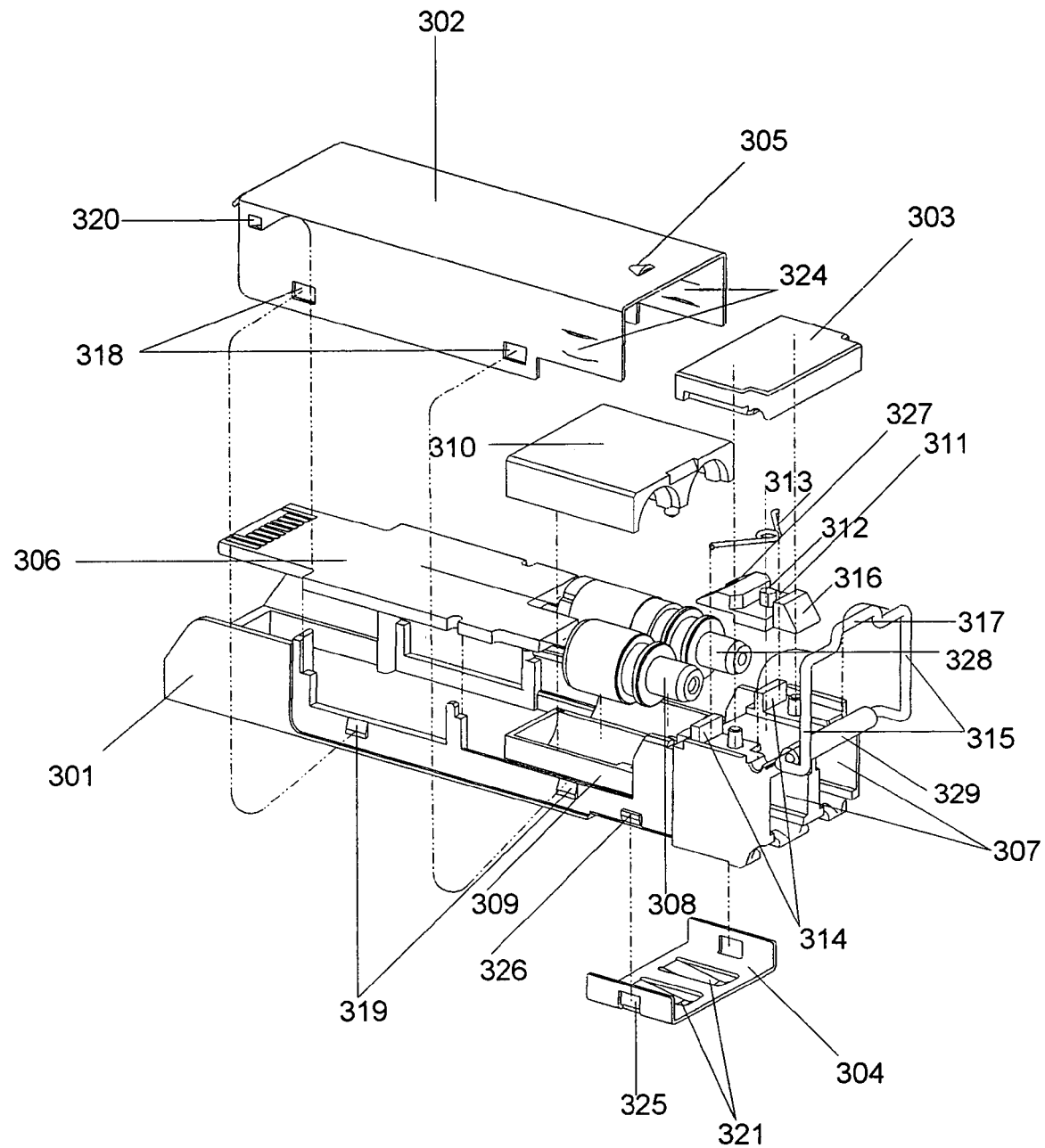
FIG. 3 is a perspective view of the mechanical structure of the SFP optical transceiver module.

FIG. 3 is a perspective view of the mechanical structure of the optical transceiver module 100 in accordance with the present invention. The optical transceiver module 100 comprises a case body of housing 301, a sheet metal cover 302, an upper case cover 303, a lower case cover 304, a triangular shaped locking detent 305, a print circuit board 306, and optical interface case cavities 307.

The printed circuit board 306 and the 20 copper foil strips on the printed circuit board, and the case body make up the electrical interface 120 for the optical transceiver module 100. This interface is SFP agreement compliant. Under the upper cover 303 is the structure for the auto restoring unlocking mechanism.

Figure 4:
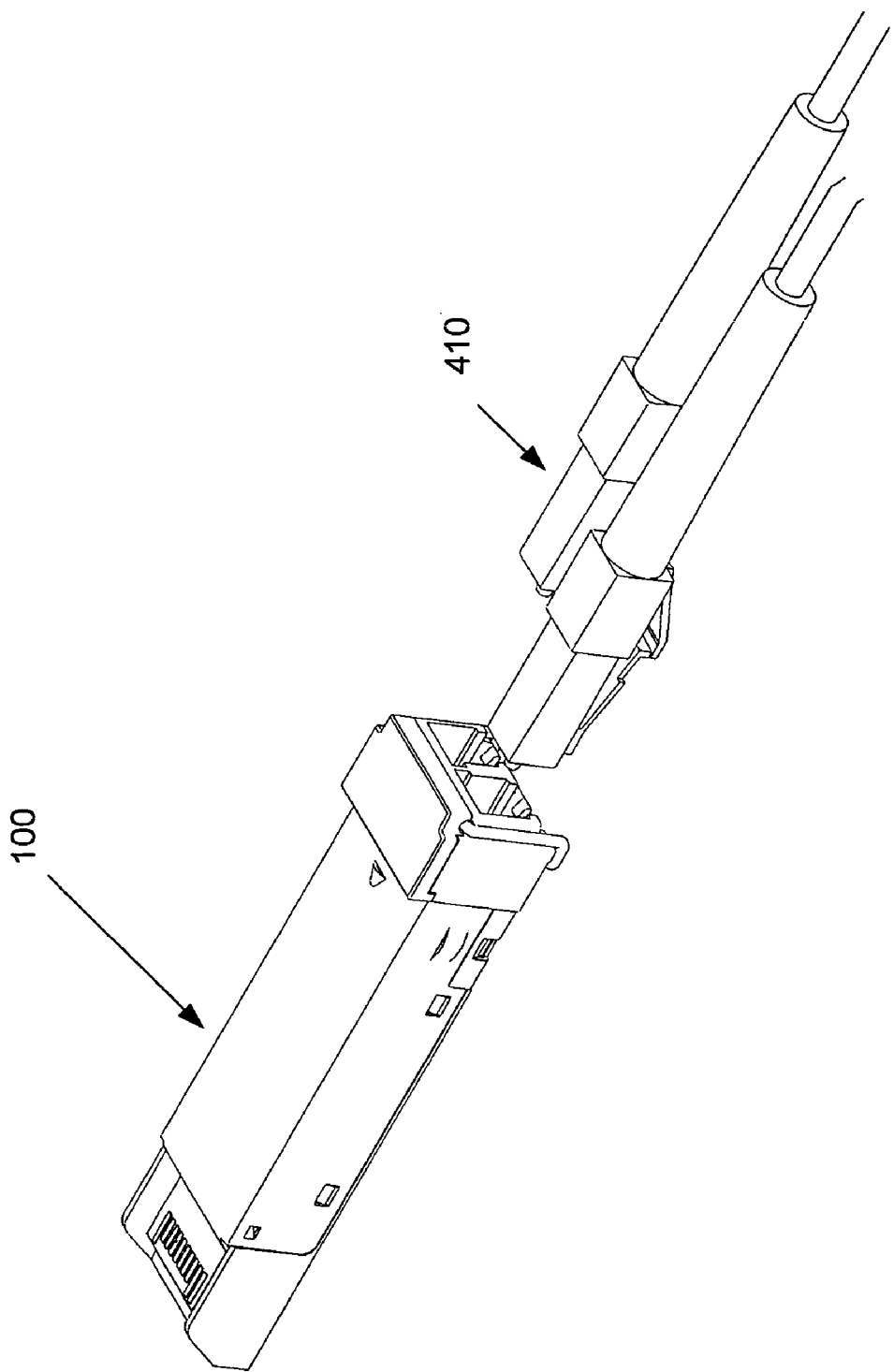
FIG. 4 is a perspective view of the relationship of the SFP optical transceiver module's optical interface with two optical fibers.

The cavities 307 make up the optical interface for the optical transceiver module 100. They are compliant to the SFP agreement. As shown in FIG. 4, the cavities 307 are to ensure that two optical components are connected with two LC connectors having optical fibers correctly.

The locking mechanism for the optical transceiver module comprises a triangular shaped locking detent 305 as shown in FIG. 3. The triangular shaped locking detent 305 is attached to the sheet metal cover 302, as shown in FIG. 3. The function of the triangular shaped locking detent 305 is to lock the optical transceiver module 100 into a receiving cage and secure its position during the receiving and transmitting of optical and electrical signals. Before the optical transceiver module 100 can be put into a working condition, it is slid into a receiving cage. For an SFP agreement compliant receiving cage, the triangular shaped locking detent 305 pushes the upper section of the receiving cage upward until it meets a part of the receiving cage where there is a locking hole fitting the triangular shaped locking detent 305. With the triangular shaped locking detent 305 fitting into the locking hole of the receiving cage, the upper section of the receiving cage falls down, locking the optical transceiver module 100 to a secured position.

While being slid into the receiving cage 210, the electrical interface of the optical transceiver module 100 comes into contact with the electrical interface in the receiving cage 210. The electrical interface's physical dimensions and the 20 copper foil strips are compliant with SFP agreement. When the optical transceiver module 100 is slid into the receiving cage 210, only the first end 120 of the optical transceiver module 100 slides into the receiving cage 210. The optical interface 130, covered by the upper case cover 303 is left outside the receiving cage 210.

Figure 5:
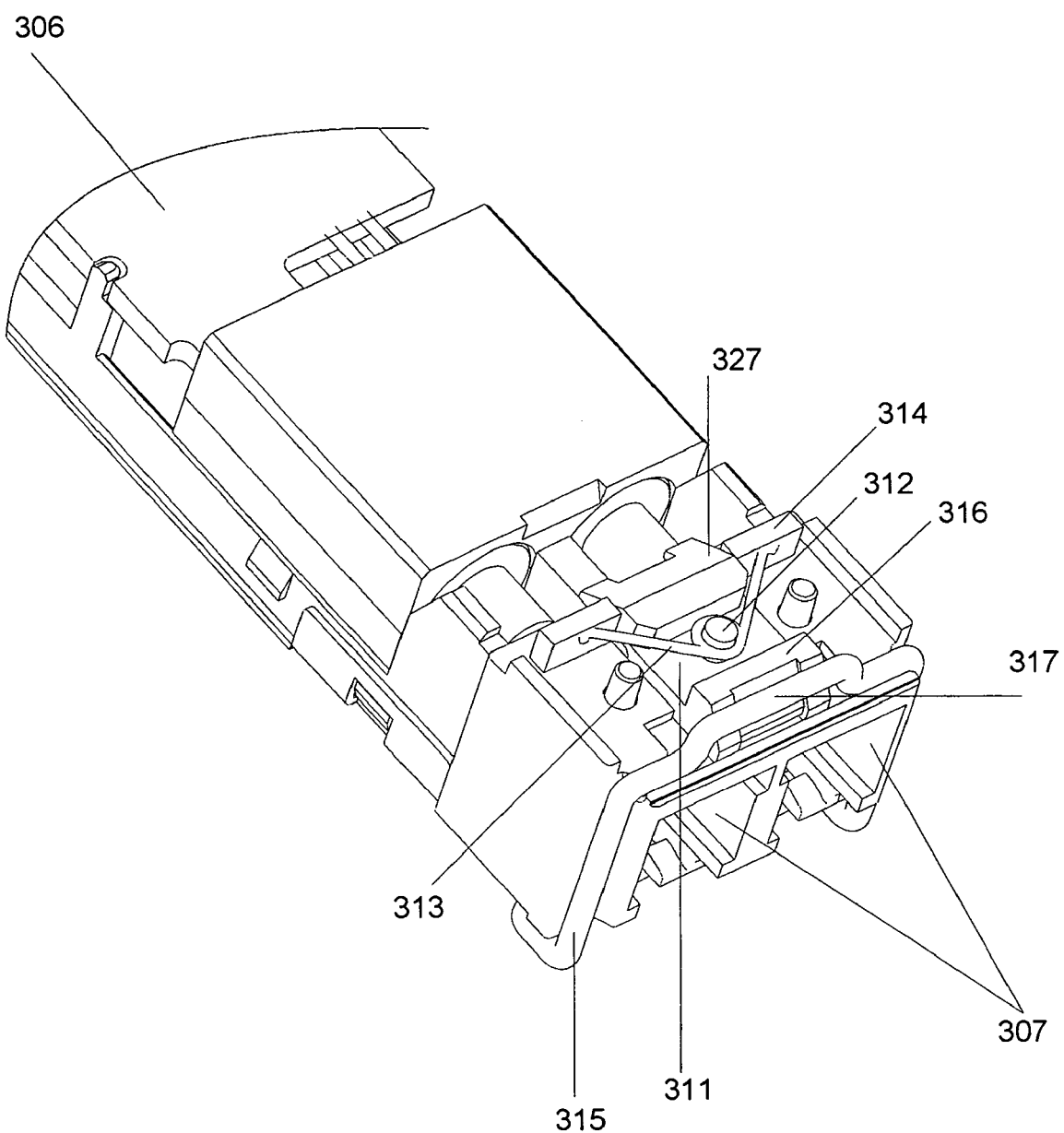
FIG. 5 illustrates the design of the auto restoring unlocking mechanism of SFP.

When the optical transceiver module 100 needs to be taken out of its receiving cage 210, an unlocking mechanism is needed to unlock the optical transceiver module 100 from the receiving cage 210. The unlocking mechanism on the optical transceiver module 100 is shown in FIG. 5. The unlocking mechanism comprises a sliding plate 311 with a wedge shaped edge 327, a spring baffle 314, a restoring spring 313 locked by a spring locking pin 312, the inclined part of slide plate with wedge shaped edge 316, an unlocking lever 315 and the crank part 317 of the unlocking lever 206. The wedge angle is between 0 and 90 degrees (for example, 45 degrees).

Figure 6:
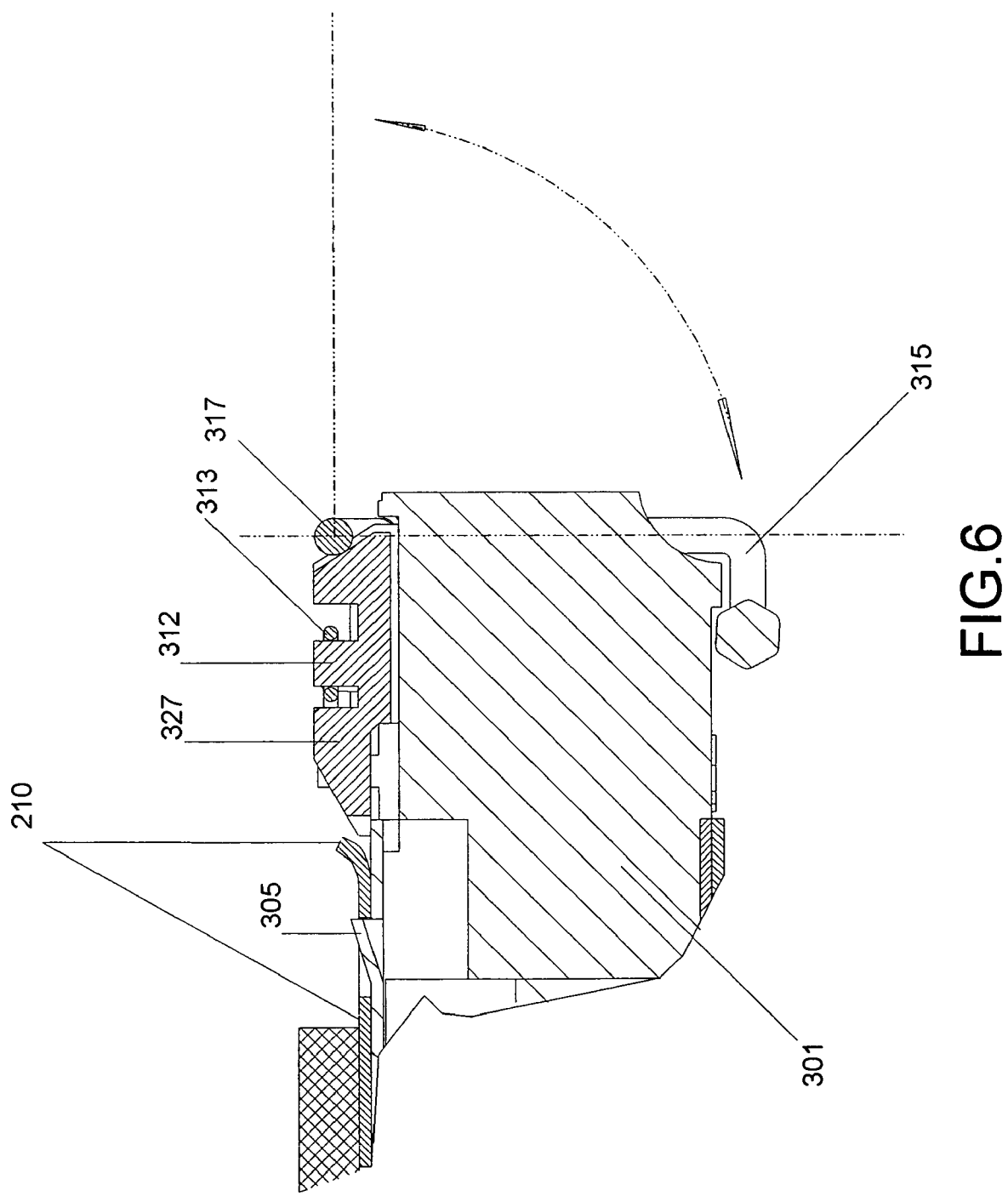
FIG. 6 is a perspective view of the SFP optical transceiver module locked inside a receiving cage.

The unlocking of the optical transceiver module 100 relies on a rotation of the unlocking lever 315 from its normal position. The normal position of the unlocking lever 315 is illustrated in FIG. 6. As shown in FIG. 6, when the unlocking lever 315 is in its normal position, the wedge shaped edge of the sliding plate 311 is close to but not contacted to the edge of the receiving cage 210, and the triangular shaped locking detent 305 is in the locking hole of the receiving cage 210.

Figure 7:
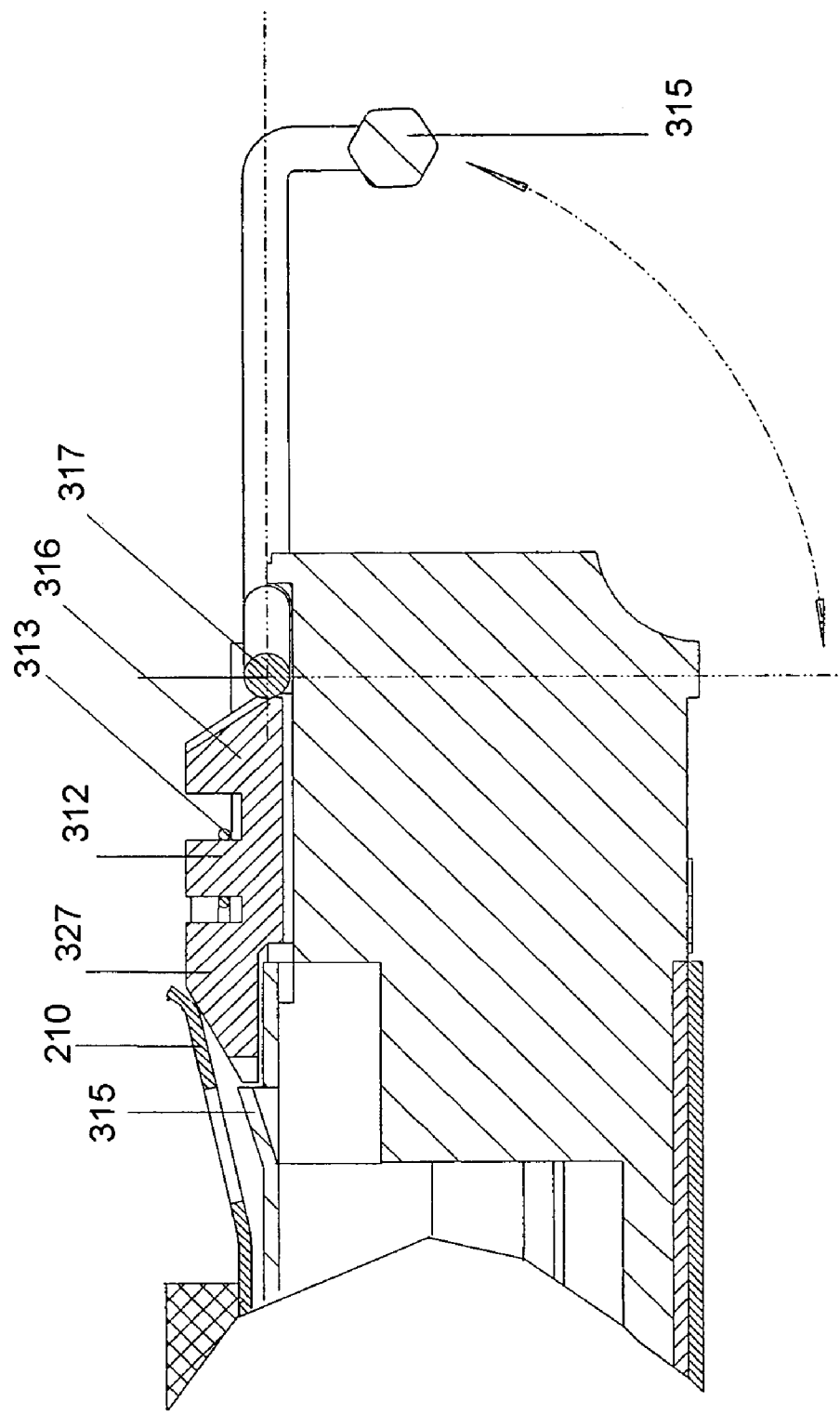
FIG. 7 is a perspective view of the SFP optical transceiver module unlocked from the receiving cage.

In FIG. 7, the unlocking lever 315 is rotated from its normal position around the hole axis. The rotation of the unlocking lever 315 pushes the sliding plate 311 inward the receiving cage 210. As the sliding plate 311 moves inward, its wedge shaped part 327 pushes the upper section of the receiving cage 210 upward, as shown in FIG. 7, to allow the triangular shaped locking detent 305 to be released from the locking hole of the receiving cage 210. The relative dimensions between the wedge shaped part of the sliding plate 311 and the triangular shaped locking detent 305 in a finished module are such that the pushing of sliding plate 311 can produce enough upward movement of the upper section of the receiving cage 210 to allow the release of the triangular shaped locking detent 305 from the locking hole of the receiving cage 210. After the unlocking, it is possible for optical transceiver module 100 to be taken out of the receiving cage 210 by pulling the unlocking lever 315.

One issue with the unlocking mechanism is that there is a lack of common agreement on how to restore the sliding plate 311 to its normal position from its inward position after the unlocking of the optical transceiver module 100 takes place. Without such an automatic-restoring unlocking mechanism for the sliding plate 311, friction forces between the sliding plate 311 and the rails the sliding plate 311 slides along can keep the sliding plate 311 from returning to its normal position. Without the sliding plate 311 in its normal position, the optical transceiver module 100 is not in a locking condition, so that the optical transceiver module 100 cannot be locked in a receiving cage. Therefore, a step of manually restoring the sliding plate 311 is required.

The present invention introduces an automatic-restoring unlocking mechanism that restores the sliding plate 311 to its normal (original or locking) condition immediately after the optical transceiver module 100 is unlocked from a receiving cage, thus making the optical transceiver module 100 always in normal condition. The automatic restoring unlocking mechanism operates as the following.

After the optical transceiver module 100 is unlocked, the sliding plate 311 usually still remains in the unlocking position. The optical transceiver module 100 cannot be properly locked unless the sliding plate 311 is restored to its normal position. The normal position of the sliding plate 311 is hereby defined as the position such that the edge of the wedge shaped part of the sliding plate is near the left side of the upper case cover 303, and not jammed between the metal sheet cover 302 and the upper section of the cage. A restoring spring 313 attached to the sliding plate 311 by a spring locking pin 312 is used to automatically restore the sliding plate 311 to its normal position. When the sliding plate 311 moves inward, the restoring spring 313 is pressed against a spring baffle 314, which is attached to the case body 301. When the unlocking lever 315 of the optical transceiver module 100 is released, the pressing force on the restoring spring 313 is released. The restoring spring 313 expands back, pushing the sliding plate 311 outward. This outward movement of the sliding plate 311 causes the unlocking lever 315 to rotate back to its normal position. If the optical transceiver module 100 is out of the receiving cage 210, the optical transceiver module 100 is now ready to be locked again; and if the optical transceiver module 100 still operates in the receiving cage 210, the optical transceiver module is locked again.

The present invention provides an advantageous optical transceiver module compared to the prior art systems. U.S. Patent Publication 20030206403 titled "Pluggable optical transceiver with push-pull actuator release collar", for example, discloses a mechanism having a push-pull actuator release collar. The system disclosed in the present invention possesses the following advantages compared to the mechanism having the push-pull actuator release collar: First, the automatic-restoring unlocking mechanism in the present invention is more reliable than the above prior art mechanism using a push-pull actuator release collar. The invention mechanism makes use of a restoration spring to restore the normal position of an optical transceiver module that is more reliable and long lasting than the pair of leaf springs used in the prior-art mechanism. Secondly, the invention mechanism having a single restoration spring is less expensive than the above prior-art mechanism. Thirdly, the invention mechanism is easier to use than the above prior-art mechanism. The invention mechanism relies on a rotation of the unlocking lever 315 to release the optical transceiver module 100, which is much easier than the prior-art mechanism that requires the pushing of a rectangle shaped actuator collar to release the optical transceiver module 100.

A feature of the present invention is that the optical transceiver module 100 has a special mechanical structure, designed to make it easy for changes of optical components inside the optical transceiver module 100. In particular, if the optical transceiver module 100 contains one optical transmission component and one optical reception component, the optical transceiver components can be from different manufacturers and therefore there can be various physical dimensions for the optical transceiver components. This makes it necessary to redesign the case body of an optical transceiver module every time a new type of optical transceiver component is used. This invention introduces a locating mechanism to accurately locate the two optical transceiver components inside the case body of an optical transceiver module. With this locating mechanism, the design of the case body of an optical transceiver module can be kept the same when a new optical transceiver component is used. Only the locating rack and its corresponding retainer inside the case body need to be redesigned.

Figure 8:
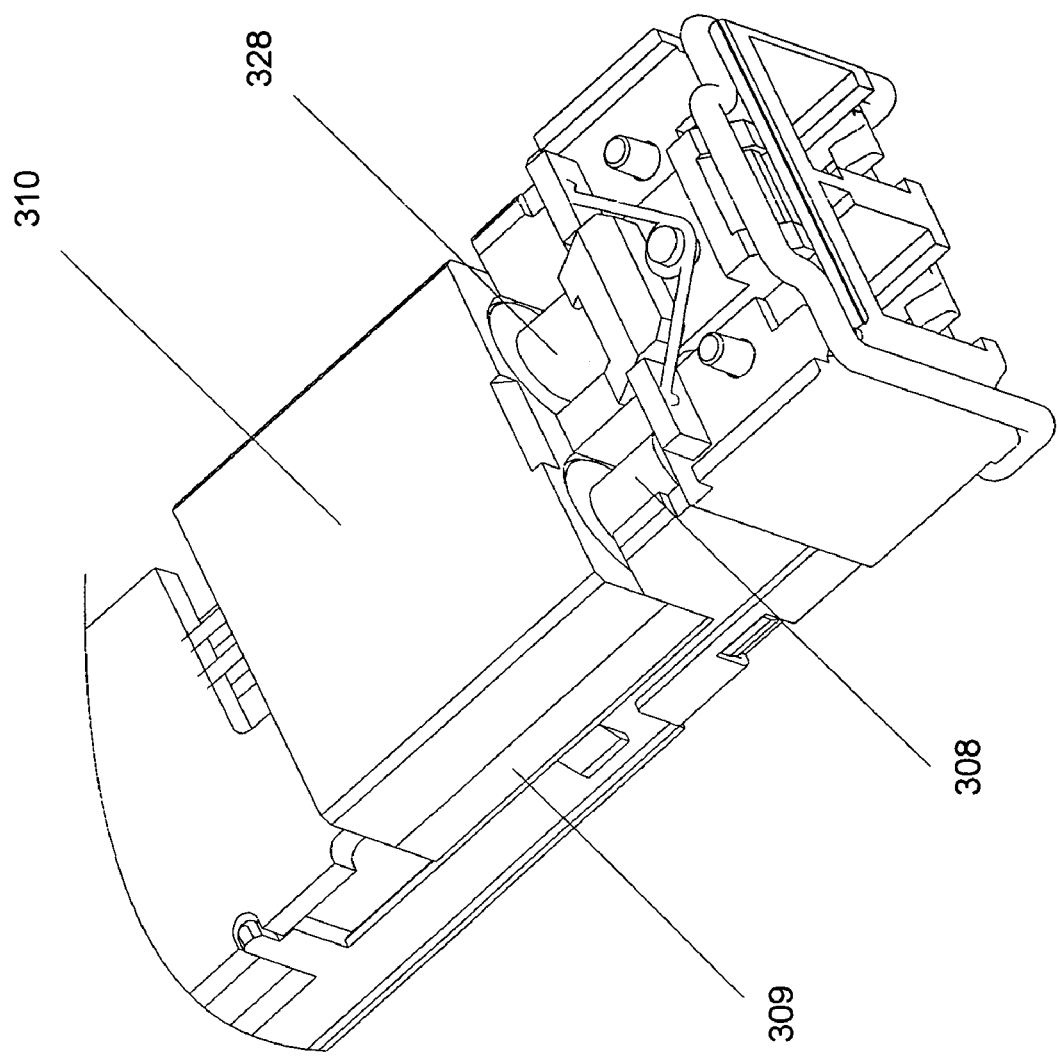
FIG. 8 is an external view of the locating mechanism for the two optical transceiver components.
Figure 9:
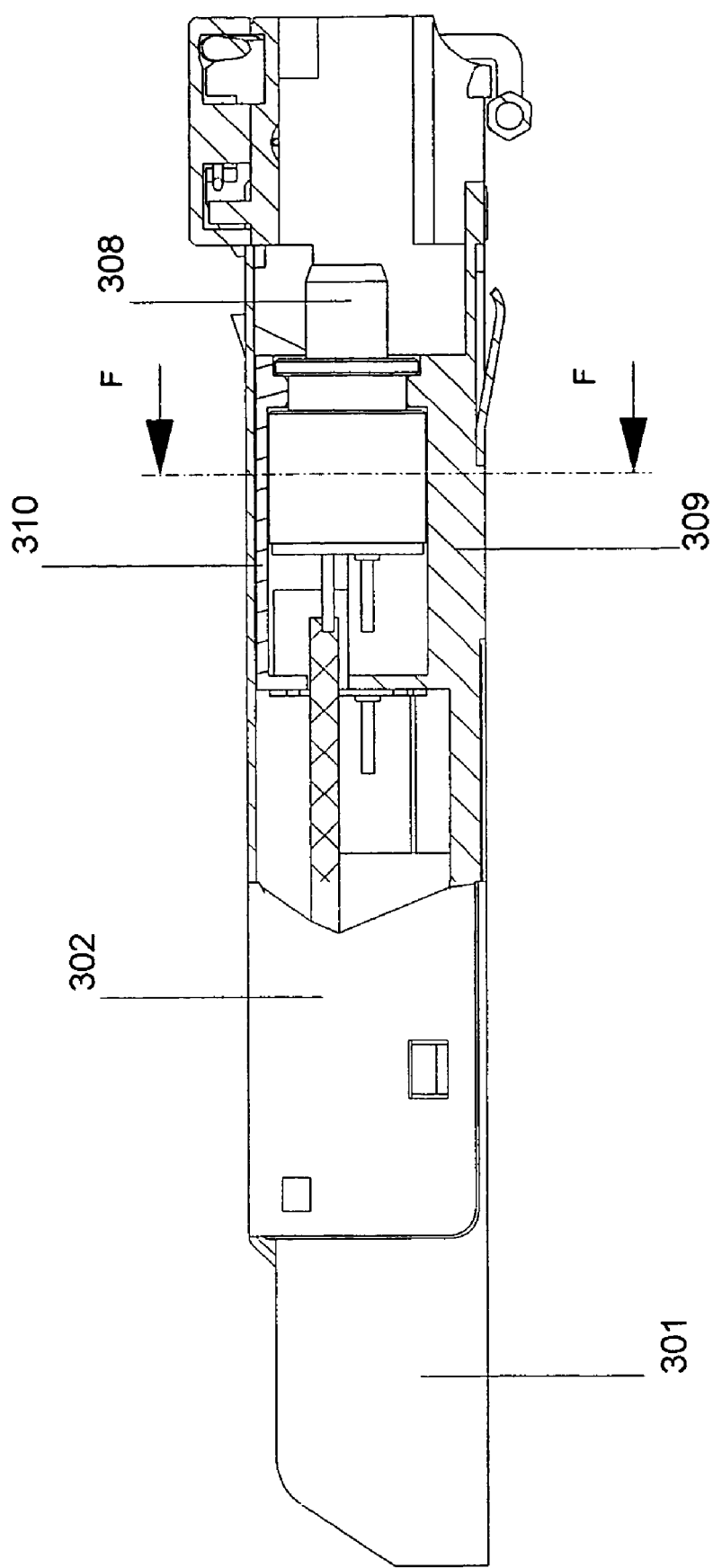
FIG. 9 is an internal view of the locating mechanism for the two optical transceiver components.
Figure 10:
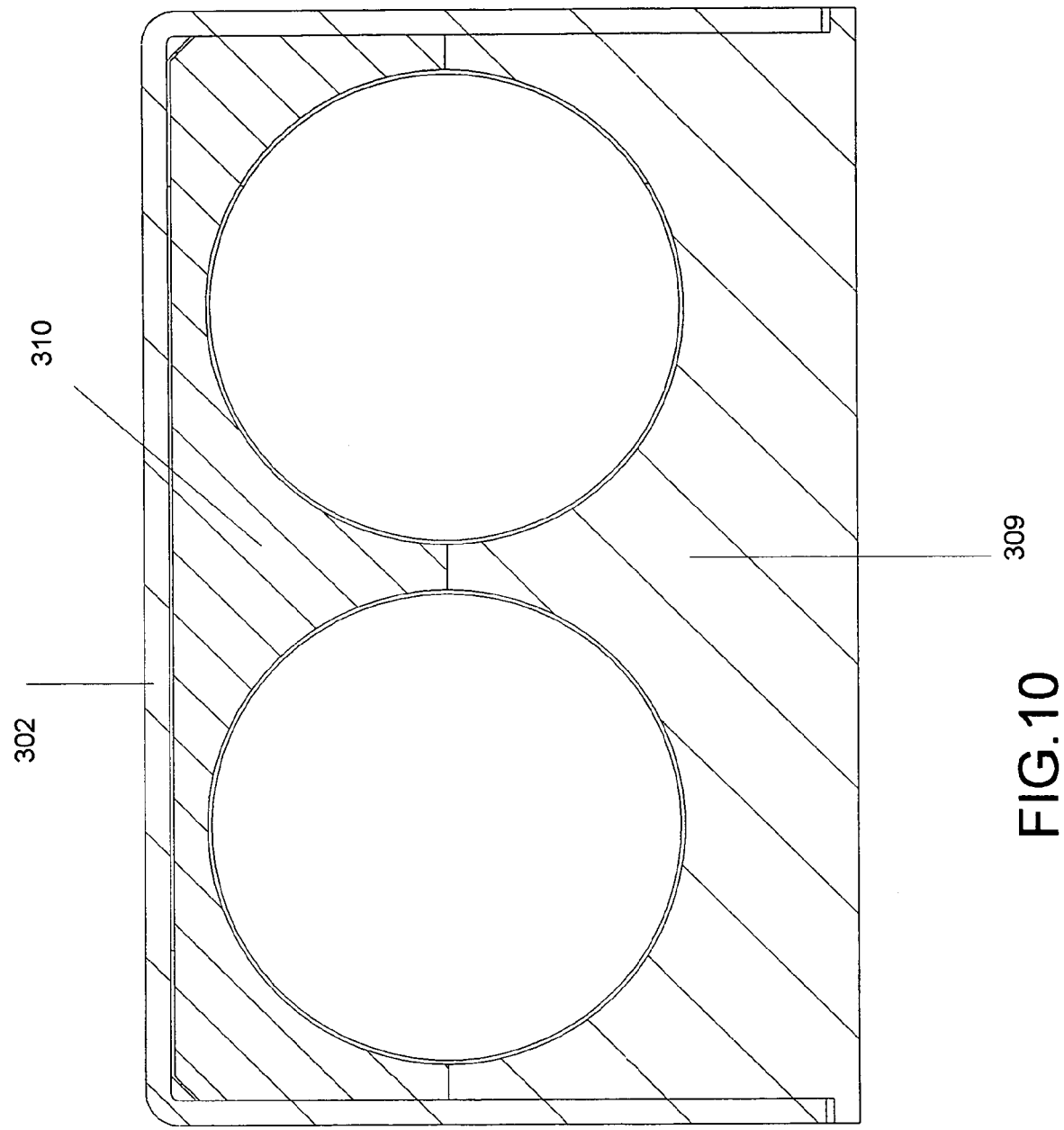
FIG. 10 is another internal view of the locating mechanism for the two optical transceiver components.

The locating mechanism, shown in FIG. 8, comprises a locating rack 309, and a corresponding retainer 310. The locating rack 309 and the retainer 310 can also be viewed in FIG. 9 and FIG. 10. Constrained between the locating rack 309 and the retainer 310 are two optical transceiver components: optical transceiver component 328 for signal transmission and optical transceiver component 308 for signal reception. The combination of the locating rack 309 and the corresponding retainer 310 accurately locates the two optical transceiver components 328 and 308 to their corresponding locations. When the two optical transceiver components need to be replaced by components from another manufacturer with a different physical dimension, only the locating rack 309 and the corresponding retainer 310 need to be redesigned. By doing so, there is no need to redesign the case body 301 of the optical transceiver module 100 for various optical transceiver components.

The locating rack 309 and its corresponding retainer 310 can be connected to the case body 301 of the optical transceiver module 100 by a number of bolts. One other way of connecting the locating rack 309 to the case body 301 is to cast the locating rack 309 to the case body 301. The cast for the case body may contain a special made part for the locating rack 309. When a new kind of optical transceiver component is used, the special part of the cast can be easily replaced so that a new case body can be cast out with a new locating rack 309 that accurately fits the physical dimension of the new optical transceiver component.

The present invention therefore provides a modular optical transceiver module that comprises an interchangeable locating mechanism that restrains the one or more optical transceiver components. The interchangeable locating mechanism is specifically designed for locking the specific design of the one or more optical transceiver components. The modular optical transceiver module is compatible to a plurality of interchangeable locating mechanisms each specifically designed for locking a plurality of optical transceiver components of different designs.

In addition to accurately locate the two optical transceiver components 328 and 308, the locating mechanism also increases the Electromagnetic Compatibility (EMC) for the two optical transceiver components 328 and 308. As the two optical transceiver components 328 and 308 are close to each other inside the case body of the optical transceiver module 100, the electromagnetic fields from the two optical transceiver components 328 and 308 may interfere each other, causing transmission or receiving errors. The locating rack 309 and the retainer 310 are designed to separate the two optical transceiver components 328 and 308 in different cavities. Thus the electromagnetic field from one optical transceiver component is shielded from mixing with the electromagnetic field from the other optical transceiver component, thus avoiding electromagnetic field interfering between each other and from the ambient environment. The presence of the locating rack 309 and the retainer 310 increases the reliability of the signal transmission and signal reception.

The designs of the case body 301, the sheet metal cover 302, the upper case cover 303, and the lower case cover 304 in the present invention provides allow the assembly of the optical transceiver module 100 to be easier, faster, more accurate and more cost effective.

Figure 11:
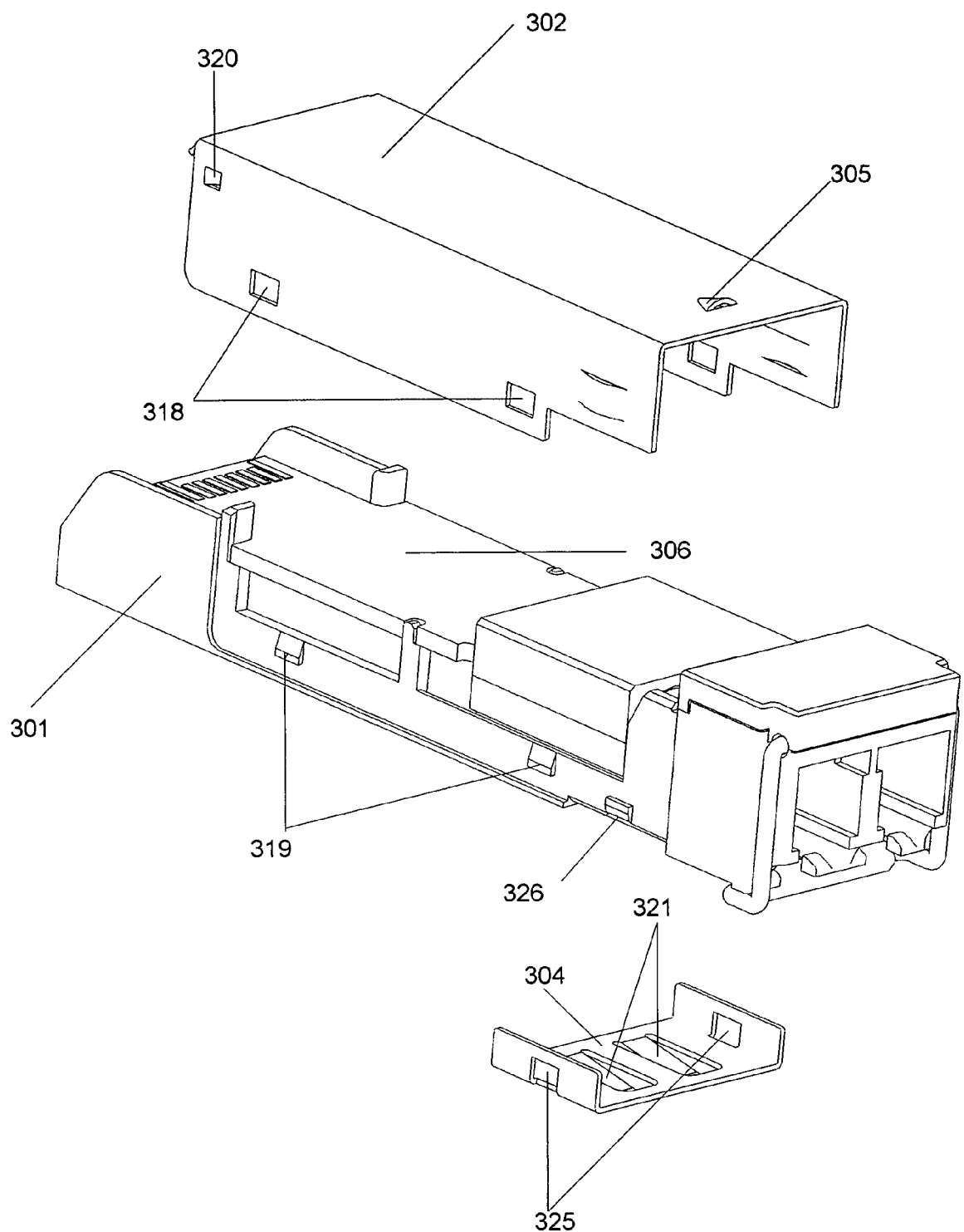
FIG. 11 is a perspective view of detailed mechanical designs of the sheet metal cover, the upper case cover and the lower case cover.
Figure 12:
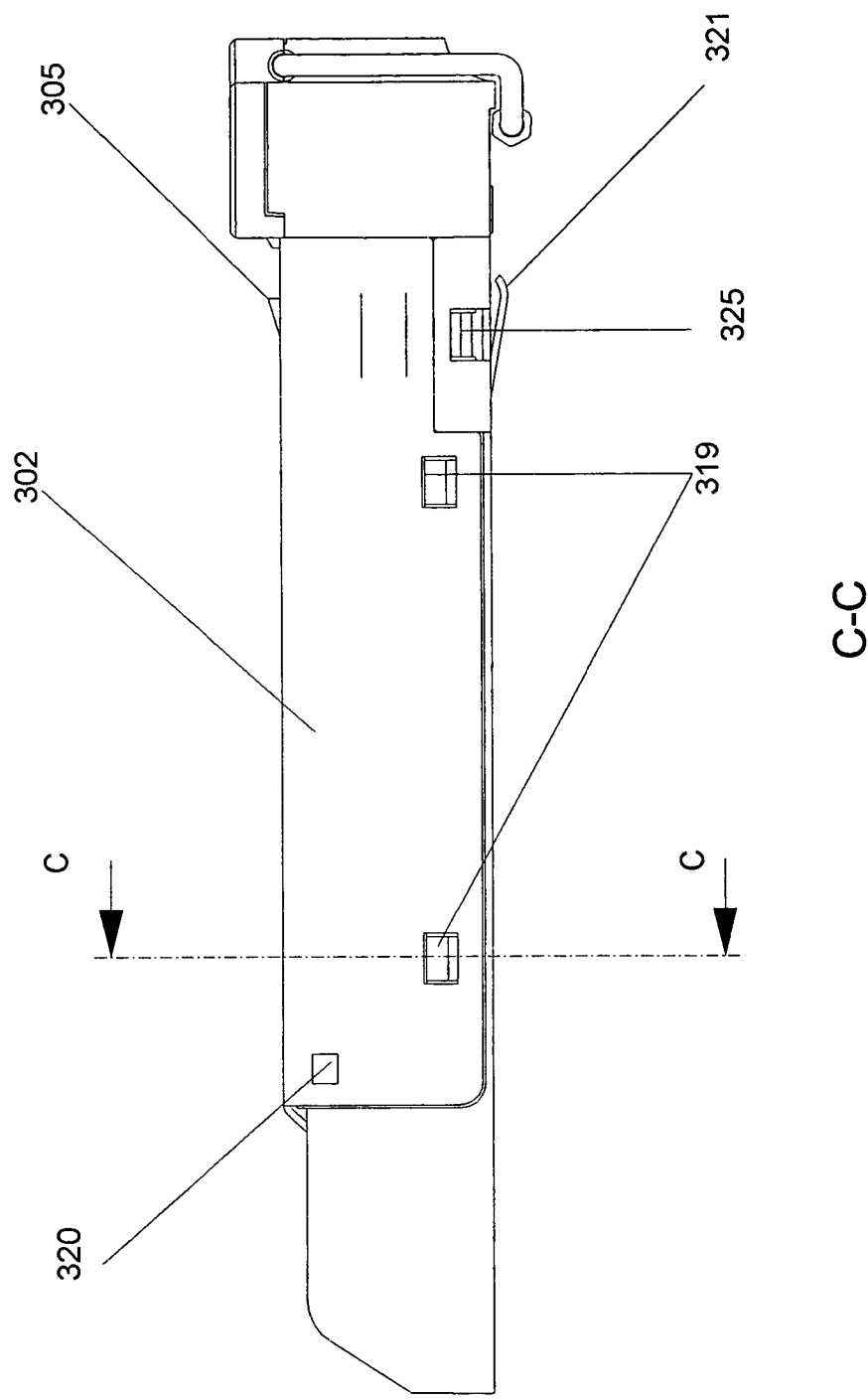
FIG. 12 is a detailed description of how the sheet metal cover and the lower case cover are connected to the case body.

FIG. 11 is a blown out figure for the mechanical design of the optical transceiver module 100. The sheet metal cover 302 has four position defining holes 318 (two on each side of the sheet metal cover 302). The locations of the four position defining holes 318 are designed to precisely map the four latches 319 on the case body 301 (two on each side). When the sheet metal cover 302 is pushed down to the case body 301, the four position defining holes 318 on the sheet metal cover 302 precisely lock into the four latches 319 on the case body 301, as shown in FIG. 12.

The lower case cover 304 has two position defining holes 325 (one on each side of the lower case cover 304). The locations of the two position defining holes 325 are designed to precisely map the two latches 326 on the case body 301 (one on each side). When the lower cover 304 is pushed up to the case body 301, the two position defining holes 325 on the lower case cover 304 precisely lock into the two latches 326 on the case body 301, as shown in FIG. 12.

Figure 13:
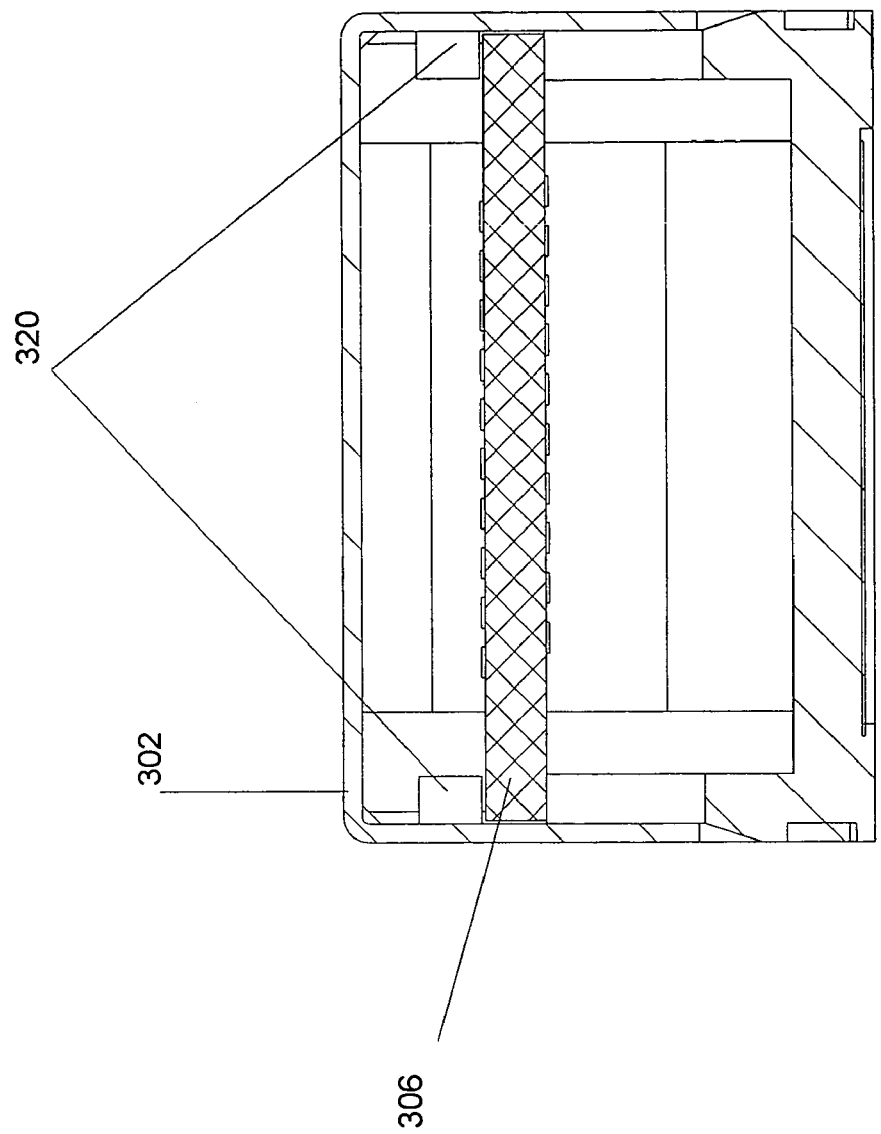
FIG. 13 is a perspective view of how the printed circuit board is located by the two guide lugs on the sheet metal cover.

The sheet metal cover 302 has two guide lugs 320 (one on each side). The height of the guide lugs 320 are designed to make the guide lugs get a perfect contact with the printed circuit board 306, when the sheet metal cover 302 is pushed down and locked into the case body 301. This perfect contact between the guide lugs 320 and the printed circuit board 306, as shown in FIG. 13, locks the printed circuit board 306 from any movement in the vertical direction. The case body 301 locks the printed circuit board 306 from any horizontal, as shown in FIG. 11.

The lower case cover 304 has two leaf springs 321, as shown in FIG. 11. When the optical transceiver module 100 is pushed into its receiving cage 210, the leaf springs 321 are pressed. The elastic force from the leaf springs 321 secures a good contact between the optical transceiver module 100 and its receiving cage 210. This good contact in term secures a small contact resistance between the optical transceiver module 100 and its receiving cage 210, thus the receiving cage 210 provides a good shield for the optical transceiver module 100 from external electromagnetic fields.

Figure 14:
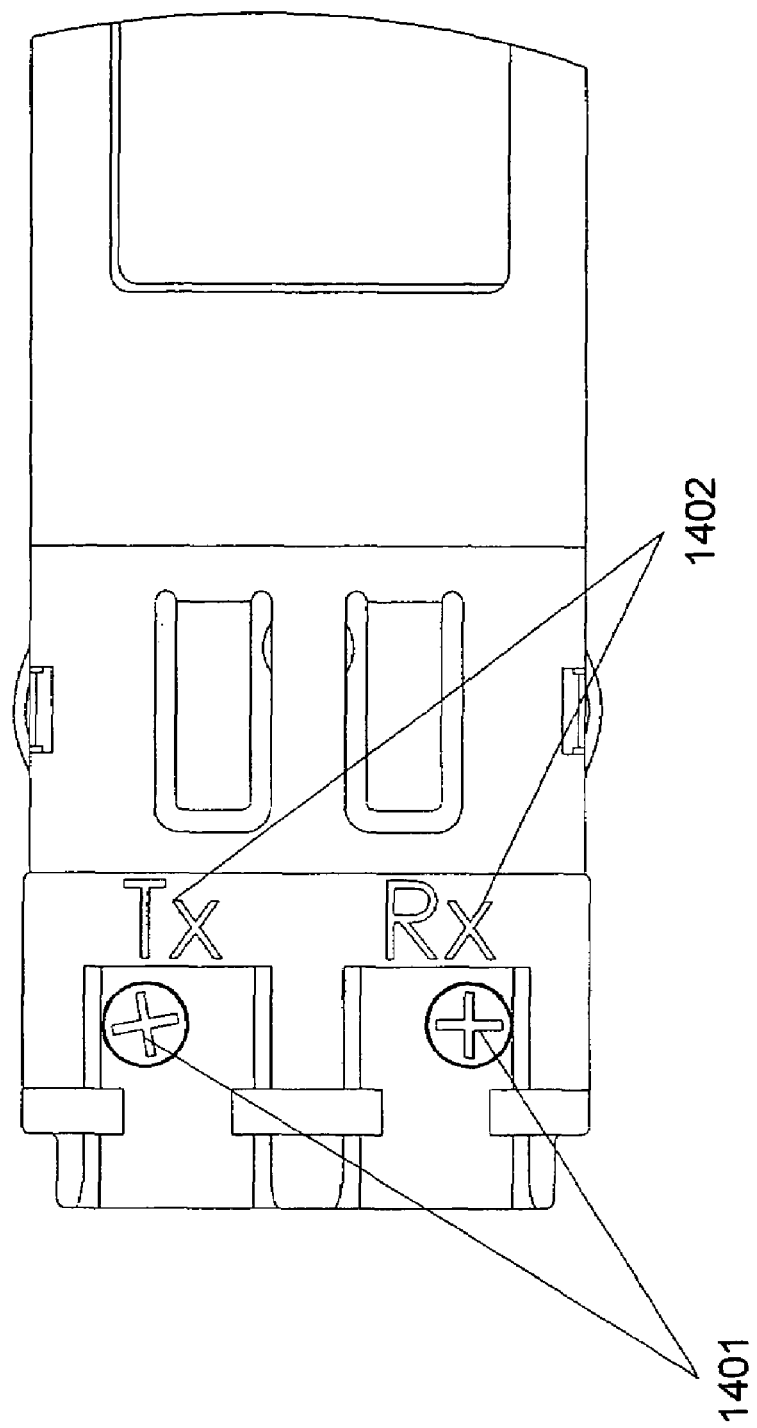
FIG. 14 shows how the upper case cover is connected to the case body and the optical interface direction labels for the transmitting and receiving signals.
Figure 15:
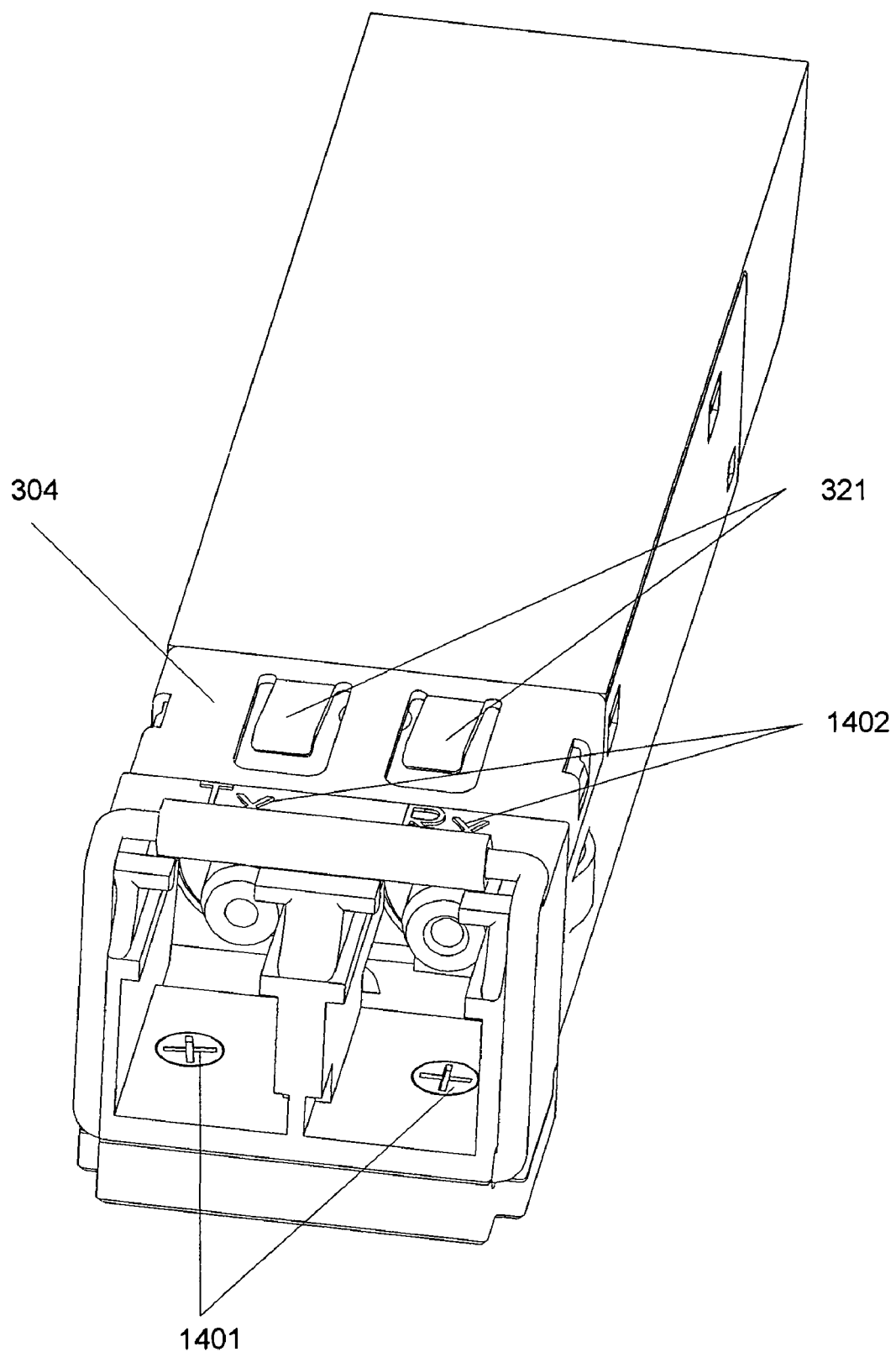
FIG. 15 is another perspective view of the locating bolts for the upper case cover and the optical interface direction labels.

The upper case cover 303 is connected to the case body 301 by two bolts 1401 from inside the two cavities 307, as shown in FIG. 14 and FIG. 15. This kind of connection leaves the upper case cover 303 a cleaner external look.

Finally, the lower case cover 304 has two text labels 1502, representing the directions of the transmitting signal and the receiving signal. In some prior arts, arrows are used in the places of the TX and RX labels 1502. The advantage of the text labels 1502 is, they are more understandable to people who are not experts in the telecommunication field.

The automatic restoring unlocking mechanism and the mechanism for locating optical components discussed in the present invention is applicable to other types of pluggable optical transceiver modules. For example, the disclosed mechanisms apply to modules compiling with the SFP (Small Form-factor Pluggable) agreement, as well as the Bi-directional SFP module. In both cases, a locking/unlocking mechanism is needed to plug/unplug the optical transceiver module into and from a receiving cage. Thus an automatic restoring mechanism is needed. In the SFP case, two optical components need to be located by the locating mechanism disclosed in the present invention.

The design features described in the present invention are advantageous to several prior art systems, for example, U.S. Patent Publication 20040008954 titled "Packaging for Optical Transceiver Module". In this Patent Publication, two optical transceiver components are located in two separate rectangular shaped cavities. Electromagnetic radiations from the two optical transceiver components tend to interfere each other because the shapes of the cavities do not match the shapes of the two optical transceiver components. The present invention solves this problem by locating the two optical transceiver components in two cylindrical shaped cavities, which is assisted by a combination of a locating rack and its corresponding retainer inside the case body. When optical transceiver components of different designs are used, only the locating rack and the retainer need to be redesigned, which shortens the design cycle and reduces cost.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

PART NUMBERS 100 optical transceiver module
110 case body
120 electrical interface
130 optical interface
210 receiving cage
211 main PCB
301 case body
302 sheet metal cover
303 upper case cover
304 lower case cover
305 triangular shaped locking detent
306 printed circuit board
307 case cavity
308 optical receiving component
309 locating rack fixed inside case body
310 retainer
311 sliding plate with a wedge shaped edge
312 spring locking pin
313 restoring spring
314 spring baffle
315 unlocking lever
316 inclined part of slide plate with wedge shaped edge
317 crank part of unlocking lever
318 position defining holes on sheet metal cover
319 latches on case body
320 dents on sheet metal cover
321 leaf springs on lower case cover
324 small bulges on the sheet metal cover
325 position defining holes on lower case cover
326 latches on case body
327 wedge of the sliding plate
328 optical transmitting component
329 casing pipe
410 LC connector
1401 bolts to fix upper case cover
1402 optical interface direction labels

What is claimed is:

1. An optical transceiver module, comprising
   a) a housing comprising a first end and a second end;
   b) an electrical interface associated with the first end, said electrical interface being adapted to be locked into a receiving cage;
   c) an optical interface associated with the second end, said optical interface adapted to be connected with one or more optical transceiver components;
   d) a locating mechanism that restrains the one or more optical transceiver components;
   e) a locking mechanism that can lock the optical transceiver module to a receiving cage; and f) an automatic-restoring unlocking mechanism comprising a sliding plate, an unlocking lever, and a restoration spring, wherein the automatic restoring unlocking mechanism automatically restores the sliding plate to the normal position after the optical transceiver module is unlocked from the receiving cage.

2. The optical transceiver module of claim 1, wherein the optical interface is compatible with Small Form-factor Pluggable Transceiver MultiSource Agreement (SFP MSA).

3. The optical transceiver module of claim 1, wherein the locating mechanism includes a locating rack; and a retainer for fixing at least one of the optical transceiver components.

4. The optical transceiver module of claim 3, wherein the combination of the locating rack and the retainer accurately locates the optical transceiver component.

5. The optical transceiver module of claim 3, wherein the locating rack is accurately connected to the case body by bolts.

6. The optical transceiver module of claim 3 wherein the locating rack is accurately connected to the case body by being casted onto the case body.

7. The optical transceiver module of claim 3, wherein the locating rack and the retainer shield the optical transceiver components from electromagnetic interfering from each other or from the ambient environment.

8. The optical transceiver module of claim 7, wherein the locating rack and the retainer increase the Electromagnetic Compatibility (EMC) of the optical transceiver module.

9. The optical transceiver module of claim 1, wherein the automatic-restoring unlocking mechanism is completely covered under the upper case cover.

10. The optical transceiver module of claim 1, further comprising a label indicating the direction of the receiving signals or the direction of the transmitting signals.

11. The optical transceiver module of claim 1, wherein the electrical interface complies with the Small Form-factor Pluggable (SFP) agreement.

12. The optical transceiver module of claim 1, wherein the optical interface complies with the Small Form-factor Pluggable (SFP) agreement.

13. The optical transceiver module of claim 1, wherein the electrical interface includes one or more printed circuit boards.

14. The optical transceiver module of claim 13, wherein the printed circuit board includes at least one copper foil strip.

15. The optical transceiver module of claim 1, wherein the housing comprises
  a case body;
  an upper case cover toward the first end of the housing;
  a sheet metal cover; and
  a lower case cover.

16. The optical transceiver module of claim 15, wherein the sheet metal case cover includes a locking detent for locking the optical transceiver to a receiving cage and one or more position defining holes on each side of the sheet metal cover to lock the sheet metal cover to the case body.

17. The optical transceiver module of claim 16, wherein the case body includes one or more of latches on each side for locking the sheet metal case cover and the lower case cover to the case body.

18. The optical transceiver module of claim 15, wherein the lower case cover includes one or more position defining holes on each side of the lower case cover and one or more leaf springs.

19. A modular optical transceiver module, comprising
  a) a housing comprising a first end and a second end;
  b) an electrical interface associated with the first end, said electrical interface being adapted to be locked into a receiving cage;
  c) an optical interface associated with the second end, said optical interface adapted to be connected with one or more optical transceiver components;
  d) an interchangeable locating mechanism that restrains the one or more optical transceiver components, wherein the interchangeable locating mechanism is specifically designed for locking the specific design of the one or more optical transceiver components;
  e) a locking mechanism that can lock the optical transceiver module to a receiving cage; and
  f) an automatic-restoring unlocking mechanism comprising a sliding plate, an unlocking lever, and a restoration spring, wherein the automatic restoring unlocking mechanism automatically restores the sliding plate to the normal position after the optical transceiver module is unlocked from the receiving cage.

20. The optical transceiver module of claim 19, further comprising a plurality of interchangeable locating mechanisms for locking a plurality of optical transceiver components of different designs.

* * * * *